US007764620B2

(12) United States Patent
Brousek

(10) Patent No.: US 7,764,620 B2
(45) Date of Patent: Jul. 27, 2010

(54) DIAGNOSIS OF REDUNDANT SIGNAL OUTPUT CHANNELS CONNECTED IN PARALLEL

(75) Inventor: Norbert Brousek, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 1175 days.

(21) Appl. No.: 11/371,713

(22) Filed: Mar. 9, 2006

(65) Prior Publication Data

US 2006/0206767 A1    Sep. 14, 2006

(30) Foreign Application Priority Data

Mar. 10, 2005    (EP)    ................... 05005280

(51) Int. Cl.
*H04J 1/16* (2006.01)
(52) U.S. Cl. ......................................... 370/248; 714/25
(58) Field of Classification Search ........................ None
See application file for complete search history.

(56) References Cited

U.S. PATENT DOCUMENTS

| 4,181,841 | A  | * | 1/1980  | Schaible et al. | ............... | 307/30 |
| 2001/0052088 | A1 | * | 12/2001 | Donhauser et al. | ............. | 714/38 |
| 2004/0078715 | A1 | * | 4/2004  | Vth | ............... | 714/43 |
| 2004/0088180 | A1 | * | 5/2004  | Akins, III | ....................... | 705/1 |
| 2004/0153876 | A1 | * | 8/2004  | Whetsel | ........................ | 714/47 |
| 2005/0018800 | A1 | * | 1/2005  | Hsiao | ........................... | 375/375 |
| 2005/0083093 | A1 | * | 4/2005  | Rhee | ........................... | 327/218 |
| 2005/0136867 | A1 | * | 6/2005  | Carballo | .................... | 455/127.1 |

FOREIGN PATENT DOCUMENTS

| DE | 43 12 305 A1 | 10/1994 |
| DE | 100 35 174 A1 | 12/2001 |
| EP | 0 404 992 A1 | 1/1991 |

OTHER PUBLICATIONS

Siemens; "Simatic Controller—die innovative Lösung für alle Automatisierungsaufgaben S7-400H" (Simatic—Automation system S7-400H—High Availability system); Nov. 2005; pp. 1-3 and 54-59.

* cited by examiner

*Primary Examiner*—Hong Cho
*Assistant Examiner*—Ajay P Cattungal

(57) ABSTRACT

The invention relates to a device and a method for testing for wire breakage with a redundant signal output. To ensure the most fail-safe output in particular of a digital signal, whilst at the same time supplying a diagnosis function, it is proposed that two digital output modules should be connected in parallel, in particular with a diode integrated in each channel. The diagnosis function is enabled by a driver, which, in the event of a target value for the digital signal of logical "1", connects the channel with a logical "1", while setting a channel connected parallel thereto briefly to logical "0" and at the same time carrying out an interrupt test on the channel with logical "1".

12 Claims, 2 Drawing Sheets

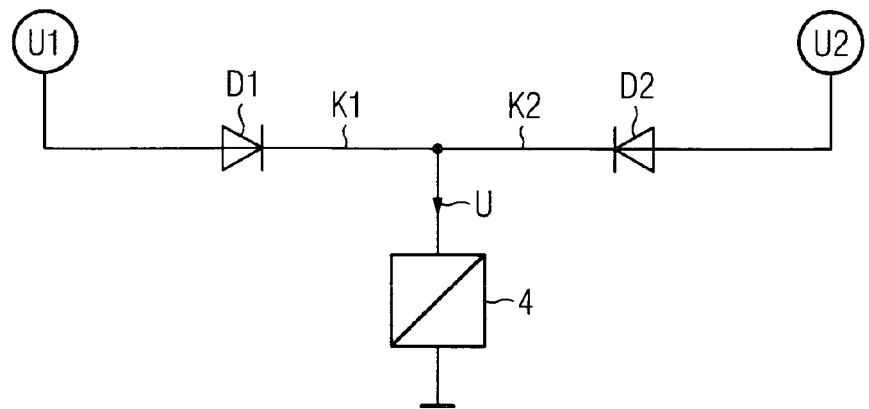
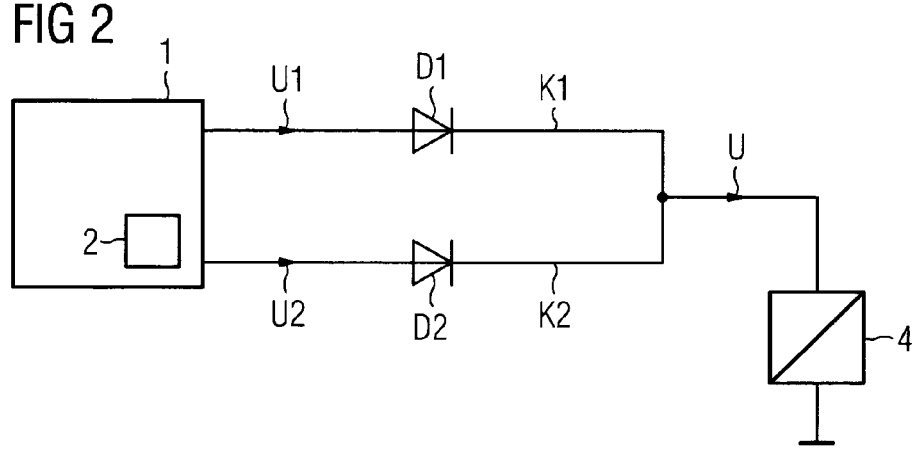
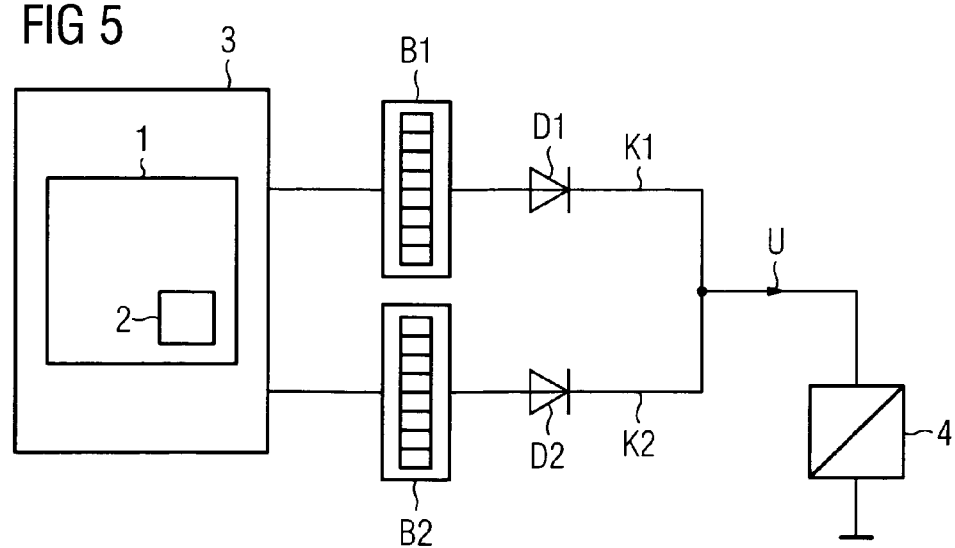

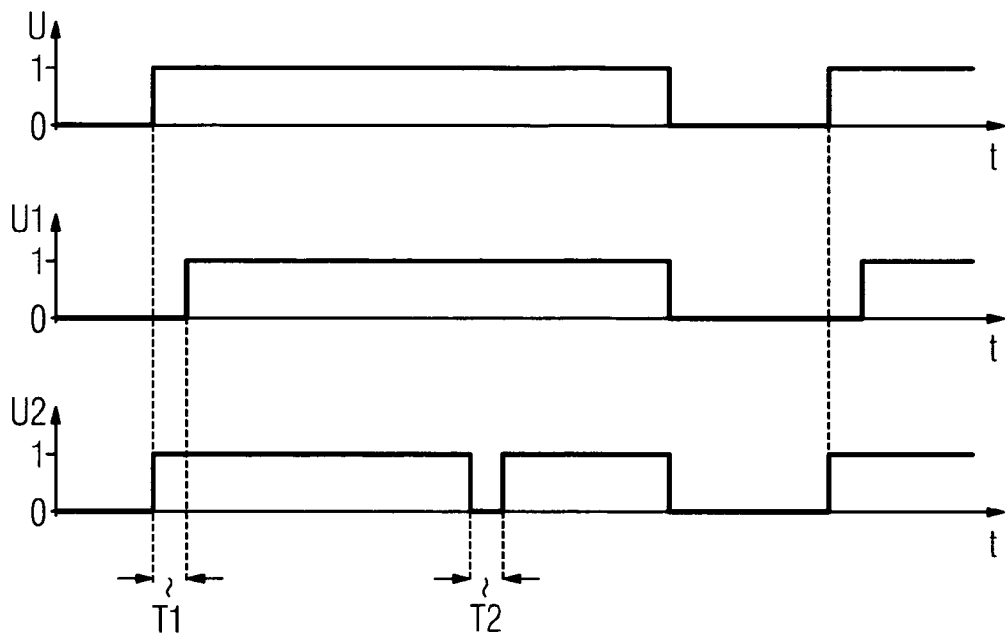
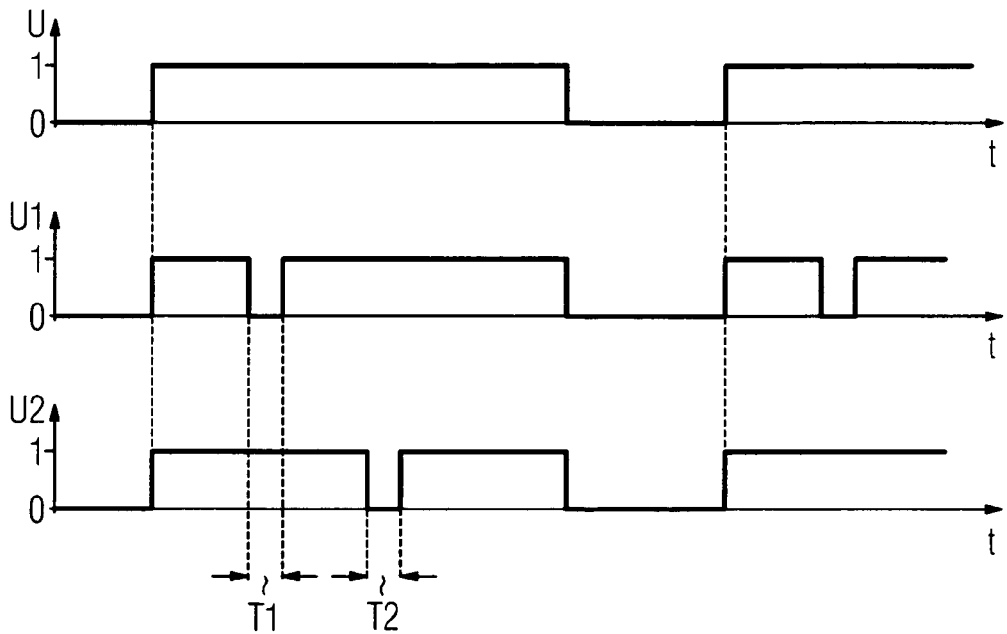

DIAGNOSIS OF REDUNDANT SIGNAL OUTPUT CHANNELS CONNECTED IN PARALLEL

CROSS REFERENCE TO RELATED APPLICATIONS

This application claims priority to the European Application No. EP 05005280.2, filed Mar. 10, 2005 which is incorporated by reference herein in its entirety.

FIELD OF INVENTION

The invention relates to a processing unit, an automation device and a method for carrying out an interrupt test on redundant output channels connected in parallel to output electrical signals.

BACKGROUND OF INVENTION

The invention is used for example in the field of automation technology for controlling continuous processes, in particular in the chemical, process engineering or pharmaceutical industry. To increase unit availability, a second redundant module is hereby connected in parallel to an output module provided for example to output an electrical signal to activate an actuator. If the one module fails, the output signal can still be supplied by the second module.

The parallel connection of redundant digital output modules to increase unit availability is known from the manual "SIMATIC—Automatisierungssystem S7-400H—Hochverfügbare System" (SIMATIC—Automation system S7-400H—High availability system), 01/2004 edition. A digital output signal is supplied here by two modules connected in parallel on the output side, such that the signal is still available even if one module fails. A diode is integrated in the parallel connected modules for each channel, preventing the modules influencing each other (see FIG. 1). Modules with a diagnosis function for identifying a wire breakage are also known from this manual.

SUMMARY OF INVENTION

An object of the invention is to allow electrical signals to be output by redundant output means combined with reliable diagnosis of the output means.

This object is achieved by a processing facility for carrying out an interrupt test for at least a first and a second channel for supplying electrical signals, with the second channel being connected in a redundant and parallel manner in respect of the first and with the processing facility having a driver to predetermine the signals, with the driver being provided for the short-term predetermination of a first signal for the first channel, by means of which the first channel is switched specifically to a zero-current state and the processing facility being provided to carry out the interrupt test on the second channel while the first channel is in a zero-current state.

This object is also achieved by an automation device with such a processing facility.

The object is also achieved by a method for carrying out an interrupt test for at least a first and a second channel for supplying electrical signals, with the second channel being connected in a redundant and parallel manner in respect of the first and with a driver being used to predetermine the electrical signals, with the driver being able to predetermine a first signal briefly for the first channel, by means of which the first channel is switched specifically to a zero-current state, and with a processing facility being used to carry out the interrupt test on the second channel, while the first channel is in a zero-current state.

The object of the parallel connection of two channels to supply an output signal is to increase unit availability. Both channels supply the same output signal, such that when one channel is selected, the corresponding output signal can still be supplied by the second redundant channel.

The invention is based on the knowledge that irregular channel loading results in practice, in particular due to component tolerances. It can for example be the case that even though both channels are intended to supply the same output signal, only one channel carries a current flow. As a result a wire breakage can be incorrectly detected for the channel that is not carrying current. In order to be able to ensure a reliable interrupt test despite this problem, according to the invention the first channel is switched to zero-current, while the second channel is tested for a possible wire breakage. The zero-current state of the first channel ensures that the second channel must carry a current, if there is no interruption in the second channel.

In a particularly advantageous embodiment of the processing device the driver is provided to predetermine digital logic signals. In such an instance the claimed interrupt test is particularly simple. The processing unit is expediently provided here to carry out the interrupt test, while an output signal present at the output of the parallel connected channels is set to logical "1" by an application program.

With the parallel connection of digital output channels the first and second channels advantageously each have at least one electrical valve, in particular a diode, which is provided to decouple the channels.

If in such an instance the application program provides the output of a logical "1", the smallest different in the component parameters of the diodes or their position can ensure that only one of the channels carries a current flow. Without an embodiment of the invention this can result in the zero-current channel incorrectly reporting a wire breakage. However as soon as the current-carrying channel is specifically switched to zero-current, the current automatically commutates to the previously zero-current channel. The previously zero-current channel can now be tested for a possible interruption.

A channel can be specifically switched to zero-current to carry out the interrupt test particularly simply in the case of digital output signals, in that the driver is provided to generate the first signal by inverting the second signal for the second channel during the interrupt test. If the output signal is to be set to logical "1", both the first and second signal are set to logical "1" during operation except for the period of the interrupt test. If an interrupt test is then to be carried out for the second channel, the first signal is inverted, i.e. set to logical "0", such that the first channel is specifically switched to zero-current. This ensures that the second channel is guaranteed to carry a flow of current and that a reliable interrupt test can therefore be carried out on the channel.

The interrupt test can be initiated in two ways. In a first alternative the processing unit is provided to carry out the interrupt test on the second channel at the start of an edge, in which the output signal is set to logical "1" by the application program. When the application program wishes to switch the output from logical "0" to logical "1", just the second signal of the second channel is first set to logical "1". This ensures that the first channel is zero-current at the start of the edge and the second channel therefore has to carry the entire current. The second channel can now be tested for a possible interruption within a short time window. At the end of this time window the first signal of the first channel is also switched to logical "1", such that both channels supply the output signal in a redundant manner.

In an alternative embodiment the processing unit is provided to carry out the interrupt test on the second channel after the output signal has been set to logical "1" by the application program and the first and second signals have been set to logical "1" by the driver. In this instance both the first and second signal are first set to logical "1", as soon as the application program gives a corresponding command. After a specified period the first signal of the first channel is briefly set to logical "0", to ensure that the first channel is zero-current for a short period and the entire current must flow via the second channel. An interrupt test is carried out on the second channel and if no interruption is detected, the first channel is switched back to a logical "1".

After a certain waiting period the second channel is advantageously set to logical "0" to switch it to zero-current and to carry out an interrupt test in the first channel. In other words the processing facility is provided to carry out the interrupt test on both channels during a pulse, in which the output signal is set to logical "1" by the application program. While there is a logical "1" present at the output of the parallel connection, a sort of toggle process takes place, in which first the first channel and then the second channel is tested for a wire breakage.

In automation engineering in particular the processing unit is used particularly advantageously in that the processing unit is part of a programmable logical controller. For example the processing unit is a CPU, with which an application program is implemented. Values for an output signal can be predetermined within the application program. These values serve to activate an actuator for example.

The driver is advantageously configured as a software driver, which is part of the application program. Alternatively the driver can also be configured as a software driver, which is stored as firmware in a storage area of the processing unit.

An advantageous embodiment of an automation device with an embodiment of the disclosed processing facility comprises a first module having the first channel and a second module having the second channel. The automation device is typically a programmable logic controller, to which a first and second module can be coupled. The first component is connected parallel to the second module to increase unit availability.

In the case of digital output modules in particular in an advantageous embodiment the first diode is integrated in the first module and the second diode in the second module.

BRIEF DESCRIPTION OF THE DRAWINGS

The invention is described in more detail below with reference to the exemplary embodiments shown in the figures, in which:

FIG. 1 shows a parallel connection of two digital output modules,

FIG. 2 shows a parallel connection of two digital output modules with a processing unit for carrying out an interrupt test, FIG. 3 shows signal patterns for a first embodiment of a method for carrying out an interrupt test, FIG. 4 shows signal patterns for a second embodiment of a method for carrying out an interrupt test and FIG. 5 shows an automation device with a processing unit for carrying out an interrupt test

DETAILED DESCRIPTION OF INVENTION

FIG. 1 shows a parallel connection of two digital output modules, as known according to the prior art for increasing unit availability. An actuator 4 is controlled by means of a digital output signal U. To increase the availability of the digital output signal U, a first and second module are connected in parallel.

A first signal U1 is supplied by the first module via a first channel K1 and a second signal U2 is supplied by the second module on a second channel K2. Both channels are controlled by a processing facility such that they supply the required output signal U. If one of the modules should fail, the signal can therefore still be supplied by the redundant module, such that the actuator 4 can still be operated correctly as before.

To decouple the two channels K1,K2 from each other a first diode D1 is integrated in the first channel K1 and a second diode D2 is integrated in the second channel K2. This prevents a module feeding the other module if one channel switches before the other channel.

In practice the two diodes D1,D2 are not completely identical. This means that with an output signal U of logical "1" in some instances only one of the two channels K1,K2 carries a current. This can result in a wire breakage being incorrectly detected at the zero-current channel, when it does not actually exist. This leads to unwanted and unjustified error reports.

FIG. 2 shows a parallel connection of two digital output modules with a processing unit 1 for carrying out an interrupt test. As shown in FIG. 1, a first channel K1 of a first digital output module with a first integrated diode D1 is connected parallel to a second channel K2 of a second digital output module with a second integrated diode D2.

A driver 2 is located on the processing unit and is used to supply a first signal U1 for the first channel K1 and a second signal U2 for the second channel K2. The two digital output modules or the first and second channel K1,K2 serve to supply an output signal U in a redundant manner, said output signal U being used to activate an actuator 4. If no interrupt test takes place, the values predetermined by the driver 2 for the first signal U1 and the second signal U2 correspond to the required output signal U.

In the event of an interrupt test, the driver 2 briefly switches one of the channels K1,K2 to zero-current. The interrupt test takes place while a logical "1" is present as the output signal U of the parallel connection. In this instance one of the two channels K1,K2 is briefly switched to logical "0", while the other is tested for an interruption or wire breakage. This ensures that the channel to be tested carried current in every instance, as long as it is in the correct state.

FIG. 3 shows signal patterns for a first embodiment of a method for carrying out an interrupt test. The reference characters used correspond to the reference characters already used in FIG. 2 and identify the corresponding variables. Shown from top to bottom are the pattern over time of the output signal U, the pattern over time of the first signal U1, which is on the first channel K1, and the pattern over time of the second signal U2, which is present on the second channel K2.

In the instance shown an interrupt test is carried out on the second channel K2 at the start of an edge change in the output signal from 0 to 1. At the start of the edge, with which the output signal U changes to logical "1", the first signal first remains on logical "0", while the second signal changes to logical "1", thereby determining the value of the output signal U. The first signal U1 only finally changes to logical "1" at the end of a first time window T1.

Within the first time window T1 it is ensured that the second channel K2 carries current, as the first channel K1 is at logical "0" and is therefore definitely zero-current. An interrupt test can therefore be reliably carried out on the second channel K2 in this time window. At the end of the first time window T1 both channels are set to logical "1", such that the output signal U is supplied in a redundant manner. After a time the second signal U2 is finally switched to logical "0", such that the second channel K2 is definitely zero-current. An interrupt test is carried out on the first channel K1 within the second time window T2. The second signal is only finally switched back to logical "1" at the end of the second time window T2, such that the output signal U is supplied in a redundant manner.

The first and second time windows T1,T2 should be as small as possible, as during the time within which the interrupt test is carried out, the output signal U is only supplied by one channel. The time windows therefore represent a gap, within which, should the channel to be tested fail, the output signal cannot be supplied smoothly by the other channel.

FIG. 4 shows signal patterns for a second embodiment of a method for carrying out an interrupt test. The reference characters here also correspond to the reference characters already used in FIG. 2 and FIG. 3.

In the instance shown both the first signal U1 and the second signal U2 change to logical "1" with an edge change of the output signal U from 0 to 1. An interrupt test does not take place at first. Only after a certain time is the first signal U1 switched to logical "0" and maintained in this state for the period of a first time window T1. Within this first time window T1 it is again ensured that the first channel K1 is zero-current and the second channel K2 carries current, such that a reliable interrupt test can be carried out on the second channel K2. At the end of the first time window T1 the first signal U1 is switched back to logical "1".

After a certain time the second signal U2 is finally switched to logical "0", to switch the second channel K2 to zero-current. A reliable interrupt test can be carried out on the first channel K1 within a second signal window T2. At the end of the second time window T2 the second signal U2 is also finally switched to logical "1", such that the output signal U is once again supplied in a redundant manner.

FIG. 5 shows an embodiment of an automation device 3 with a processing unit 2 for carrying out an interrupt test. The processing unit 1 for example represents a CPU of the automation device 3, with the automation device 3 in particular being a programmable logical controller, as generally used in automation engineering.

The programmable logical controller 3 is used to implement an application program, in which target states for an actuator 4 are determined. The actuator 4 requires such target parameters in the form of a digital output signal U. The digital output signal U is supplied by two redundant digital output modules B1,B2, with a first channel K1 of the first module B1 being connected parallel to a second channel K2 of the second module B2. Each output module in this example has eight digital output channels, with only the parallel connection of the first channel K1 of the first module B1 and the second channel K2 of the second module B2 being shown here by way of example.

Both channels K1,K2 respectively have an integrated diode D1,D2, which is used to decouple the channels K1,K2. To carry out an interrupt test on the channels K1,K2, a driver 2 operating on the processing unit 1 predetermines a value for one of the channels K1,K2, which switches said channel to zero-current in a specific manner. Once one of the channels K1, K2 is in the zero-current state, the other channel can be tested for a possible interruption. The method already described with reference to FIG. 3 and FIG. 4 is used for this purpose.

The present invention should not be restricted to the embodiments shown here as examples. Instead further embodiments are possible and come within the scope of the invention, as long as the basic concept is maintained, that an interrupt test is carried out on one of the parallel connected channels K1,K2, while the other channel is forced into a zero-current state. The disclosed method for interrupt testing is also possible in particular with analog output modules connected in parallel. However such an embodiment requires a much more complex decoupling connection for the parallel channels than the simple integration of a diode in each channel.

To summarize the invention relates to a device and a method for testing for wire breakage with redundant signal output. To ensure the most fail-safe output possible, in particular of a digital signal, whilst at the same time supplying a diagnosis function, it is proposed that two digital output modules should be connected in parallel, in particular with a diode integrated in each channel. The diagnosis function is enabled by a driver, which in the event of a target value for the digital signal of logical "1", connects the channel with a logical "1", while setting a channel connected parallel thereto briefly to logical "0" and at the same time carrying out an interrupt test on the channel with logical "1".

The invention claimed is:

1. A processing unit for executing an interrupt test regarding a redundant channel having at least a first and a second channel for supplying electrical signals, the second channel connected to the first channel in parallel to form the redundant channel having an output signal, the processing unit comprising a driver for providing the electrical signals, wherein the processing unit is configured to:

execute an interrupt test during a first and second time window while a logical "1" is present as the output signal of the redundant channel by:

during the first time window, switching to or maintaining as a logical "0" a first signal on the first channel representing a zero-current state so that the output signal is only supplied by the second channel, testing the second channel for an interruption, and returning the first signal to logical "1" at an end of the first time window, and during the second time window, switching a second signal on the second channel to a logical "0" representing a zero-current state so that the output signal is only supplied by the first channel, testing the first channel for interruption, and returning the second signal to logical "1" at an end of the second time window;

wherein the first time window starts at or within a first predetermined delay from a signal edge change in the output signal from logical "0" to logical "1" and wherein the second time window starts a second predetermined time delay after the first time window ends.

2. The processing unit according to claim 1, wherein the driver is configured to generate digital logic signals.

3. The processing unit according to claim 1, wherein the redundant channel is set to logical "1" by an application program.

4. The processing unit according to claim 1, wherein the first and second channels each include at least one electrical valve for decoupling the first and second channels.

5. The processing unit according to claim 1, wherein the processing unit is further configured to execute the interrupt test on both the first and second channels during a pulse, the output signal set to logical "1" by the application program during the pulse.

6. The processing unit according to claim 1, wherein the driver is a software driver, and the software driver is part of the application program.

7. The processing unit according to claim 1, wherein the driver is a software driver stored as firmware in a memory of the processing unit.

8. The processing unit according to claim 1, wherein the processing unit is included in an automation device.

9. A method for executing an interrupt test regarding a redundant channel having at least a first and a second channel for supplying electrical signals, the second channel connected to the first channel in parallel to form the redundant channel having an output signal, and a driver provided for generating the electrical signals, the method comprising:
    executing an interrupt test by a processing unit during a first and second time window while a logical "1" is present as the output signal of the redundant channel by:
    during the first time window, switching to or maintaining as a logical "0" a first signal on the first channel representing a zero-current state so that the output signal is only supplied by the second channel, testing the second channel for an interruption, and returning the first signal to logical "1" at an end of the first time window; and
    during the second time window, switching a second signal on the second channel to a logical "0" representing a zero-current state so that the output signal is only supplied by the first channel, testing the first channel for interruption, and returning the second signal to logical "1" at an end of the second time window;
    wherein the first time window starts at or within a first predetermined delay from a signal edge change in the output signal from logical "0" to logical "1" and wherein the second time window starts a second predetermined time delay after the first time window ends.

10. The method according to claim 9, wherein the driver generates digital logic signals.

11. The method according to claim 9, wherein the first and second channels are decoupled by first and seconds electrical diodes included in the first and second channel, respectively.

12. The method according to claim 9, wherein the interrupt test is executed on both the first and second channels during a pulse, the output signal set to logical "1" by the application program during the pulse.

* * * * *